United States Patent
Grunnet

(10) Patent No.: US 11,811,354 B2
(45) Date of Patent: Nov. 7, 2023

(54) CONTROL OF A WIND TURBINE USING SPLIT POWER REFERENCE SIGNALS

(71) Applicant: VESTAS WIND SYSTEMS A/S, Aarhus N (DK)

(72) Inventor: Jacob Deleuran Grunnet, Tranbjerg J (DK)

(73) Assignee: VESTAS WIND SYSTEMS A/S, Aarhus N (DK)

(*) Notice: Subject to any disclaimer, the term of this patent is extended or adjusted under 35 U.S.C. 154(b) by 101 days.

(21) Appl. No.: 17/601,385

(22) PCT Filed: Mar. 24, 2020

(86) PCT No.: PCT/DK2020/050075
§ 371 (c)(1),
(2) Date: Oct. 4, 2021

(87) PCT Pub. No.: WO2020/200378
PCT Pub. Date: Oct. 8, 2020

(65) Prior Publication Data
US 2022/0200494 A1  Jun. 23, 2022

(30) Foreign Application Priority Data
Apr. 4, 2019  (DK) .......................... PA 2019 70216

(51) Int. Cl.
*H02P 9/04* (2006.01)
*H02J 3/38* (2006.01)
*H02P 9/02* (2006.01)

(52) U.S. Cl.
CPC ................ *H02P 9/04* (2013.01); *H02J 3/381* (2013.01); *H02P 9/02* (2013.01); *H02J 2300/28* (2020.01)

(58) Field of Classification Search
CPC ..... H02P 9/02; H02P 9/04; H02J 3/381; H02J 2300/28
See application file for complete search history.

(56) References Cited

U.S. PATENT DOCUMENTS

| 2011/0089693 A1 | 4/2011 | Nasiri |
| 2011/0221280 A1* | 9/2011 | Delmerico .............. H02J 3/381 307/151 |

(Continued)

FOREIGN PATENT DOCUMENTS

| CA | 3018726 A1 | 3/2019 |
| CN | 108631335 A | 10/2018 |

(Continued)

OTHER PUBLICATIONS

PCT International Search Report for Application PCT/DK2020/050075 dated Apr. 6, 2020.

(Continued)

*Primary Examiner* — Sean Gugger
(74) *Attorney, Agent, or Firm* — Patterson + Sheridan, LLP

(57) ABSTRACT

A method of controlling a wind turbine connected to an electrical grid is provided. The method comprises generating a turbine control reference signal and a grid control reference signal. The turbine control reference signal is provided to a machine side unit of a power or torque control system of the turbine to control the amount of energy generated by the turbine. The grid control reference signal is provided to a line side unit of the power or torque control system to control the amount of energy transferred to the electrical grid based on the grid control reference signal.

19 Claims, 6 Drawing Sheets

(56) References Cited

U.S. PATENT DOCUMENTS

2011/0222320 A1 9/2011 Delmerico et al.
2012/0056602 A1 3/2012 Li et al.

FOREIGN PATENT DOCUMENTS

| CN | 108695897 A | 10/2018 |
| CN | 109560733 A | 4/2019 |
| EP | 2865889 A1 | 4/2015 |
| WO | 2020200378 A1 | 10/2020 |

OTHER PUBLICATIONS

PCT Written Opinion or The International Searching Aurhority for Application PCT/DK2020/050075 dated Apr. 6, 2020.
Danish Patent and Trademark Office, 1st Technical Examination for Application PA 2019 70216 dated Sep. 26, 2019.
Danish Patent and Trademark Office, Search Opinion for Application PA 2019 70216 dated Sep. 26, 2019.
Danish Patent and Trademark Office, Search Report for Application PA 2019 70216 dated Sep. 23, 2019.
European Patent Office, Communication Pursuant to Article 94(3) EPC for Application 20 716 698.4-1202 dated May 31, 2023.

\* cited by examiner

CONTROL OF A WIND TURBINE USING SPLIT POWER REFERENCE SIGNALS

FIELD OF THE INVENTION

The present invention relates to a method of controlling a wind turbine using power reference signals, and to a control system for a wind turbine.

BACKGROUND OF THE INVENTION

Modern wind turbines are typically variable-speed turbines. In such turbines, the power output is controlled, at least in certain operational modes, by controlling the speed at which the blades can rotate. For example, a torque can be applied to the rotor to limit rotational speed during high winds. The rotor speed may be controlled using a power controller or a torque control system. The power or torque control system is in turn controlled using a power reference signal, typically generated by the turbine's main controller. As used herein, a power or torque control system may refer to a converter of the wind turbine, or to a power controller or torque controller.

The power reference signal may be generated based on the requirements of various control systems of the turbine. For example, the power reference signal may set an average rotor speed based on semi-static wind conditions, as well as providing for small variations to that average rotor speed for temporary condition changes. For example, small variations in the power reference signal may be used to provide damping to counteract vibrations in the turbine.

However, the extent to which such control systems can change the power generated by the turbine is limited by the needs of the electricity grid to which the turbine is connected. Power fluctuations caused by the control systems risk being passed to the grid. As a result, there may be a need impose limits on the amount of power variation the turbine control systems can apply, limiting the effectiveness of these systems.

Some grid operators are introducing a requirement that new turbines should emulate a synchronous generator. In a synchronous generator, there is a direct link between the grid and the rotor of the generator, enabling the generator to smooth out power disturbances in the grid. Such a virtual synchronous machine concept, when implemented on a wind turbine, would mean that disturbances on the grid are fed directly back into the mechanical power of the turbine, disrupting the control system of the turbine.

SUMMARY OF THE INVENTION

A first aspect of the invention provides a method of controlling a wind turbine connected to an electrical grid, the method comprising:
  generating a turbine control reference signal comprising a primary static power level signal and one or more secondary control system signals, the secondary control system signals include damping signals to dampen oscillations in the turbine;
  generating a grid control reference signal as the primary static power level signal;
  providing the turbine control reference signal to a machine side unit of a power or torque control system of the turbine;
  controlling, using the machine side unit, the amount of energy generated by the turbine based on the turbine control reference signal;
  providing the grid control reference signal to a line side unit of the power or torque control system; and
  controlling, using the line side unit, the amount of energy transferred to the electrical grid based on the grid control reference signal.

The turbine control reference signal thus comprises a primary signal and one or more secondary control system signals. The primary static power level signal may be a semi-static signal, semi static in the sense that any variations are noise related. The turbine control reference signal may be the sum of the primary signal (the grid control reference signal) and the one or more control system signals.

In some embodiments a time-dependent difference between the turbine control reference signal and the grid control reference signal averages to zero within a predetermined time window. The duration of the predetermined time window may for example be between 10 seconds and 2 minutes, or between 30 seconds and 1 minute.

In some embodiments, controlling the amount of energy generated by the turbine may comprise controlling the amount of energy provided by the machine side unit to, or extracted by the machine side unit from, a battery connected between the machine side unit and the line side unit. Alternatively or additionally, controlling the amount of energy transferred to the electrical grid may comprise controlling the amount of energy extracted by the grid from, or provided by the grid to, the battery.

In some embodiments the method may further comprise receiving a grid performance indicator. Controlling the amount of energy provided to, or extracted from, the battery may be based on the grid performance indicator.

In some embodiments the method may further comprise adjusting the turbine control reference signal and/or the grid control reference signal based on a remaining storage capacity of the battery.

In some embodiments controlling the amount of energy generated by the turbine may comprise controlling the amount of energy provided, by the turbine, to a resistor connected between the machine side unit and the line side unit.

In some embodiments the power or torque control system may be or comprise a converter. And here it is understood that the term converter is used in a broad understanding including both power electronics and a logic controller, so that the converter as a whole may control the actual counter torque imposed on the rotor and/or control the actual power injected into the grid.

In some embodiments, controlling the energy transferred to the electric grid may comprise emulating a synchronous generator.

A second aspect of the invention provides a wind turbine control system configured to:
  generate a turbine control reference signal;
  generate a grid control reference signal;
  provide the turbine control reference signal to a machine side unit of a power or torque control system of the turbine to control the amount of energy generated by the turbine;
  provide the grid control reference signal to a line side unit of the power or torque control system to control the amount of energy transferred to the electrical grid.

The control system may be further configured to perform the method of any of embodiment of the first aspect.

A third aspect of the invention provides a wind turbine comprising a control system according any embodiment of the second aspect.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
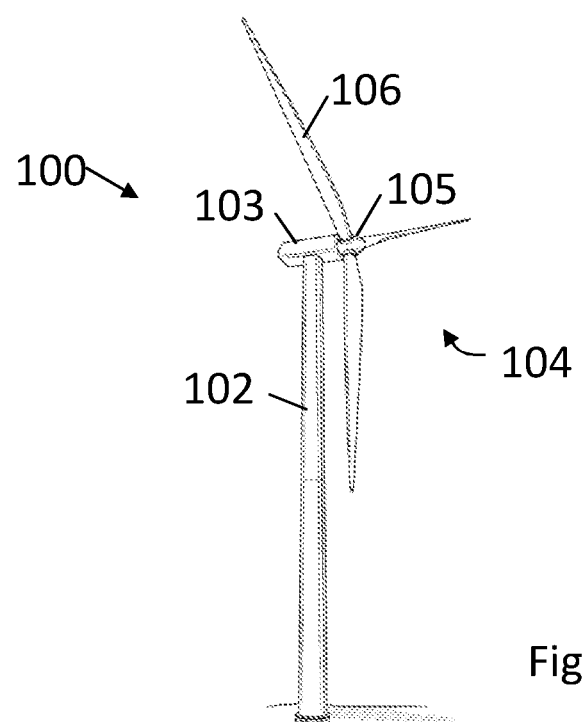
FIG. 1 is a schematic representation of a wind turbine.

FIG. 1 illustrates, in a schematic perspective view, an example of a wind turbine 100. The wind turbine 100 includes a tower 102, a nacelle 103 at the apex of the tower, and a rotor 104 operatively coupled to a generator housed inside the nacelle 103. In addition to the generator, the nacelle houses miscellaneous components required for converting wind energy into electrical energy and various components needed to operate, control, and optimize the performance of the wind turbine 100. The rotor 104 of the wind turbine includes a central hub 105 and a plurality of blades 106 that project outwardly from the central hub 105. In the illustrated embodiment, the rotor 104 includes three blades 106, but the number may vary. Moreover, the wind turbine comprises a control system. The control system may be placed inside the nacelle or distributed at a number of locations inside the turbine and communicatively connected.

The wind turbine 100 may be included among a collection of other wind turbines belonging to a wind power plant, also referred to as a wind farm or wind park, that serve as a power generating plant connected by transmission lines with a power grid. The power grid generally consists of a network of power stations, transmission circuits, and substations coupled by a network of transmission lines that transmit the power to loads in the form of end users and other customers of electrical utilities.

Figure 2:
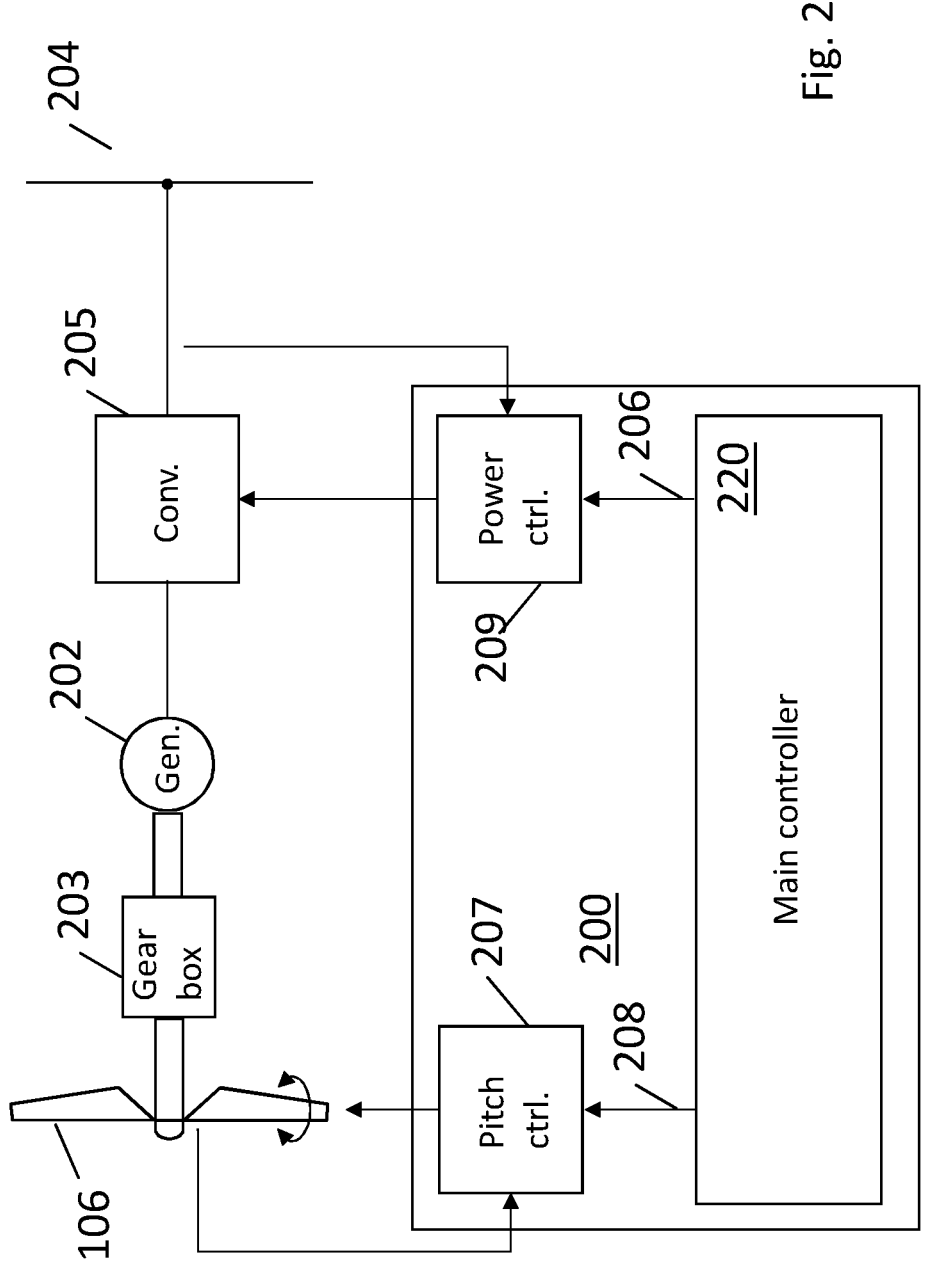
FIG. 2 is a schematic representation of a control system of the wind turbine.

FIG. 2 schematically illustrates an embodiment of a turbine control system 200 together with elements of a wind turbine 100. The wind turbine comprises rotor blades 106 which are mechanically connected to an electrical generator 202 via gearbox 203. In direct drive systems, and other systems, the gearbox 203 may not be present. The electrical power generated by the generator 202 is injected into a power grid 204 via a electrical converter 205. The converter 205 comprises a machine side unit, a DC-link, and a line side unit. Power generated by the turbine 100 is passed from the machine side unit to the DC-link, and then onto the line side unit to be passed to the grid 204. The electrical generator 202 and the converter 205 may be based on a full scale converter (FSC) architecture or a doubly fed induction generator (DFIG) architecture, but other types may be used.

The turbine control system 200 comprises a number of elements, including at least one main controller 220 with a processor and a memory, so that the processor is capable of executing computing tasks based on instructions stored in the memory. In general, the wind turbine controller ensures that in operation the wind turbine generates a requested power output level. This is obtained by adjusting the pitch angle of the blades 106 and/or the power extraction of the converter 205. To this end, the control system comprises a pitch system including a pitch controller 207 controlled using a pitch reference signal 208, and a power system including a power controller 209 controlled using a power reference signal 206. The wind turbine rotor comprises rotor blades that can be pitched by a pitch mechanism. The rotor comprises an individual pitch system which is capable of individual pitching of the rotor blades, and may comprise a common pitch system which adjusts all pitch angles on all rotor blades at the same time. The turbine control system, or elements of the turbine control system, may be placed in a power plant controller (not shown) so that the turbine may be operated based on externally provided instructions.

The power controller 209 and the converter 205 (comprising the machine side converter unit, DC link, and line side converter unit) may together be considered to be an example of a power or torque control system. The power controller 209 may comprise separate control blocks for controlling each of the machine side unit and line side unit of the converter. As used herein, 'machine side unit' and 'line side unit' are to be understood as referring generally to both the respective power electronics and the respective logic controller, so that line side unit/machine side unit as a whole may control the actual counter torque imposed on the rotor/the actual power injected into the grid. Thus, in embodiments described below in which the machine side unit receives a turbine control reference signal, and controls the power extracted from the wind based on the reference signal, it is to be understood that a machine side logic controller receives the turbine control reference signal and controls machine side power electronics to control the power extracted from the wind. Similarly, where a line side unit bases the amount of power transferred to the grid on a grid control reference signal, it is to be understood that a line side logic control receives the grid control reference signal and controls line side power electronics to control the power transferred to the grid. The machine side logic controller and/or line side logic controller may be incorporated into the power controller 209.

In conventional systems, a single power reference signal 206 is generated to control the amount of power extracted from the wind by the turbine 100 and passed to the grid. In embodiments such single power reference signal 206 may comprise a primary component and a secondary component. The primary component sets the static power output of the turbine 100. The secondary component comprises signals from one or more secondary control systems, such as damping systems of the turbine 100, which act as small variations on the primary signal. These small variations in the power reference signal 206 provide time limited fluctuations in the mechanical power or torque of the turbine 100, and so can be used, for example, to damp vibrations in the turbine. The secondary control systems feeding into the secondary component may include a side-side tower damping (SSTD) system, a drive train damping (DTD) system, and/or an extended power control (EPC) system.

The secondary components of the power reference signal 206 cause variations in the amount of power generated by the turbine 100. These variations may then be passed to the electrical grid 204 via the line side unit of converter 205, causing power fluctuations such as flicker. As a result, the amount of power variation that can be applied by the secondary control systems of a turbine must be limited.

Grid operators are also implementing new requirements that wind turbines act as a virtual synchronous generator, emulating the response of a traditional synchronous generator. In a synchronous generator, there is a direct link between the rotor used to generate electricity, and the electricity grid.

Disturbances on the grid are fed back into the generator, smoothing out the disturbances. Whilst this is beneficial for grid operation, it can have a detrimental impact on the performance of a wind turbine acting as a virtual synchronous machine (VSM).

Figure 3:
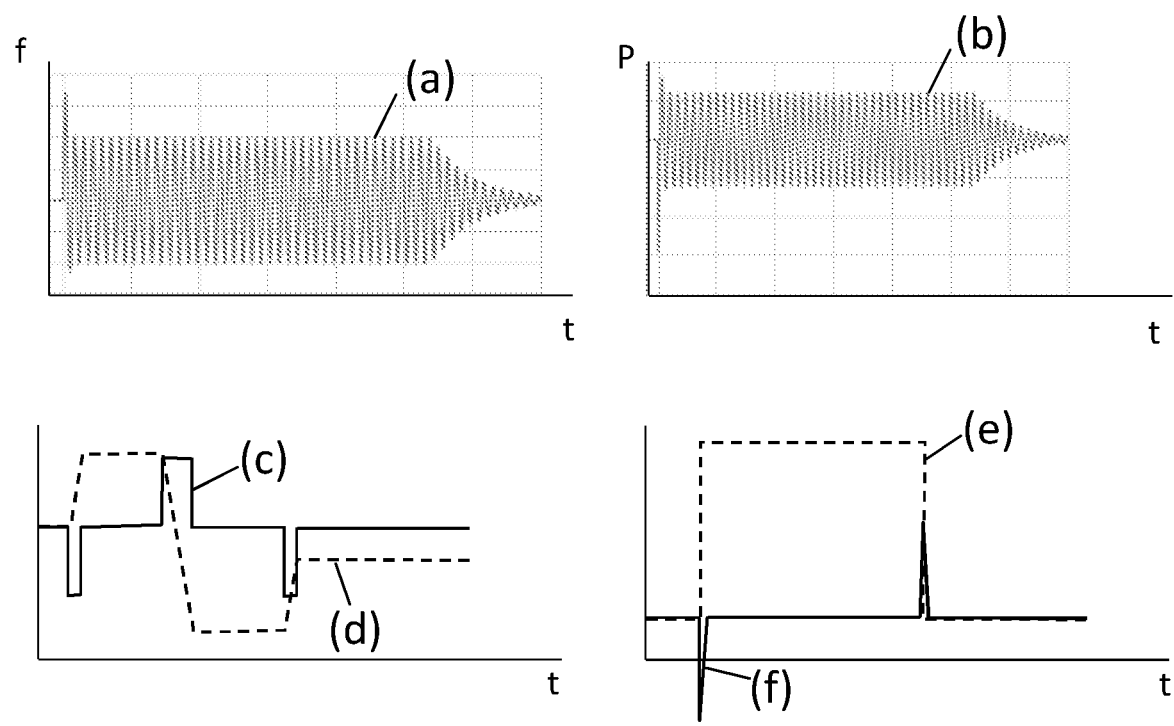
FIG. 3 illustrates virtual synchronous machine responses to grid disturbances.

A variety of grid disturbances and expected VSM generator responses are shown in FIGS. 3(a)-(f). FIGS. 3(a), (c),(e) illustrate disturbances on a grid, and FIGS. 3(b),(d),(f) illustrate the corresponding responses expected of a virtual synchronous machine.

FIG. 3(a) illustrates small time dependent oscillations in the AC frequency of electricity in the grid from its nominal value of 50 Hz. FIG. 3(b) illustrates the response expected of a VSM, in which the power generated by the VSM correspondingly oscillates to dampen the oscillations in the grid. Such power oscillations in a wind turbine will counteract the turbine's own damping systems, such as SSTD, and so limit the mechanical damping control available to the turbine.

FIG. 3(c) illustrates large deviations in the AC frequency, and FIG. 3(d) shows the corresponding VSM response. In this case the VSM is expected to increase or decrease the generated power by around 20% to smooth the transitions in the grid frequency. Such large scale power changes conflict with the aims of the power (or partial load) controller, reducing the efficiency of the turbine, and potentially damaging the mechanical components of the turbine.

FIG. 3(e) illustrates a sharp change in the grid angle of the grid (i.e. the phase difference between current and voltage in the grid). As shown in FIG. 3(f), the VSM is expected to compensate with large impulses in the generated power. Such large impulses would likely cause damage to the components of the wind turbine, notably the drive train.

Figure 4:
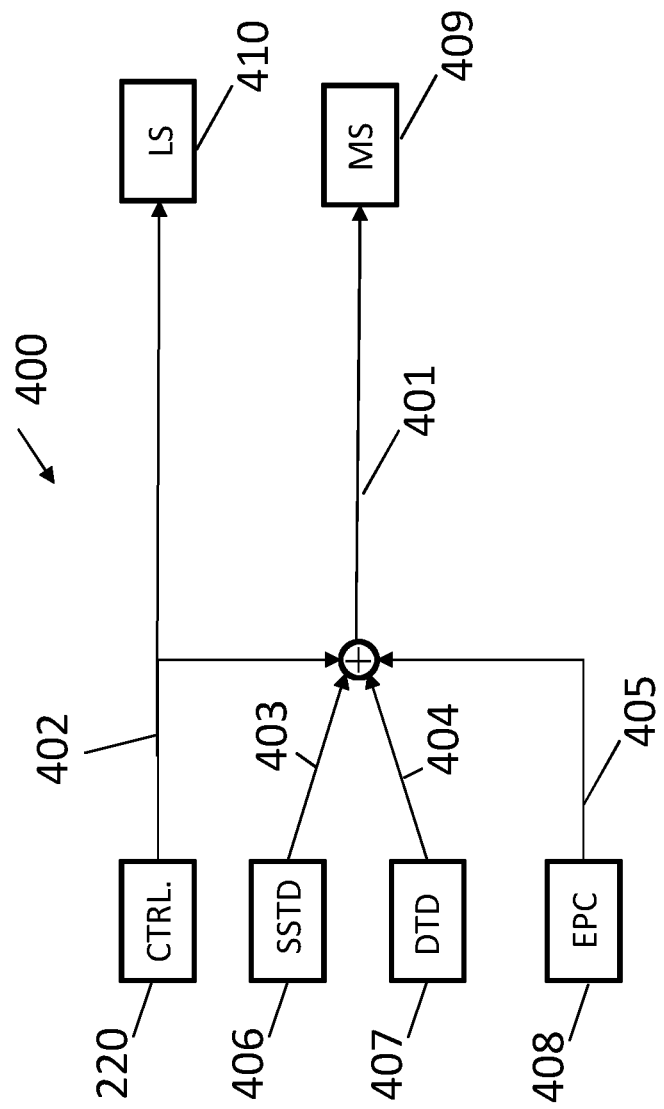
FIG. 4 illustrates elements of a turbine control system according to an embodiment of the present invention.

FIG. 4 illustrates elements of a turbine control system 400 for a wind turbine 100, which can be used to decouple the power generated by the turbine 100 from the power provided to the grid 204. This decoupling protects the grid 204 from the power variations used to control the turbine 100, and protects the turbine 100 from the requirements of the grid 204, such as VSM requirements.

Decoupling the turbine 100 and grid 204 in this way provides a number of advantages. Damping systems of the turbine 100 may be able to apply larger magnitude variations to the power generated than would conventionally be possible, as the variations will no longer be passed on to the grid 204. This may allow for reduced pitch activity, as more power control can be used in preference to pitch control. Pitch activity may also be reduced as constant power destabilisation of speed control is limited. Similarly, drivetrain loads may be reduced by more aggressive use of DTD damping than would conventionally be possible, and limiting of constant power strategy destabilisation. Reducing pitch activity and drivetrain loads reduces the rate of fatigue of the components of the turbine 100, and so increases turbine lifetime. Furthermore, the decoupling reduces flicker in the grid 204, as turbine damping system activity is no longer seen in the grid, and the annual energy production (AEP) of the turbine may be increased due to more effective turbine control.

The control system 400 generates two distinct power control reference signals, a turbine control reference signal 401; and a grid control reference signal 402. Turbine control reference signal 401 is provided to a machine side unit 409 of a power or torque control system of the turbine 100, such as the machine side unit of converter 205. The machine side unit 409 adjusts the mechanical operation of the turbine 100 based on the turbine control reference signal 401 to control the amount of energy extracted by the turbine 100 from the wind.

The grid control reference signal 402 is provided to a line side unit 410 of the power or torque control system (e.g. the line side unit of converter 205) configured to control the amount of energy transferred from the turbine 100 to the electrical grid 204 based on the grid control reference signal. The line side unit 410 may also base the power supplied to the grid 204 on a current grid condition, for example to emulate a synchronous machine response to a disturbance on the grid 204. In some embodiments, a feedback mechanism from the grid 204 may be used to provide the turbine controller/s with information about the current state of the grid, such as grid performance indicator. The grid performance indicator may provide an estimate of the health of the grid 204, and/or may indicate any disturbances in the grid 204 such a frequency or grid angle changes. This feedback may be used to inform generation of the control reference signals 401, 402, so that the reference signals are based in part on the current condition of the grid 204.

Each turbine 100 in a wind farm may be associated with an individual line side unit 410, or a plurality of turbines may supply energy to a common line side unit.

In conventional systems with only a single power control signal, the power generated by the turbine 100 equals the power transferred to the grid 204 at all times. In the present invention, the turbine control reference signal 401 can be different from the grid control reference signal 402—so the energy generated by the turbine at a particular time can be different from the energy transferred to the grid 204 at that time, providing the decoupling of the turbine 100 and grid 204 described above.

The turbine control reference signal 401 comprises a primary component, setting a static power level for the turbine operation based on the current conditions experienced by the turbine. The primary component may be generated by a main controller 220 (or partial load controller) of the turbine 100. As shown in FIG. 4, this primary component may be the grid control reference signal 402.

As shown in FIG. 4, the turbine control reference signal 401 also comprises a number of secondary control system signals 403-405, each generated by a corresponding secondary control system 406-408. The secondary control system signals 403-405 are summed with the primary component of the turbine reference signal (i.e. the grid control reference signal 402 in the illustrated embodiment) to form the turbine control reference signal 401. The secondary control system signals 403-405 include damping system signals intended to dampen oscillations in the turbine by applying small variations to the static power generated by the turbine 100. The secondary control system signals are thus time varying signals. In an embodiment the signals may be oscillating signals with an amplitude and a phase set or determined by the respective secondary control system in accordance with the desired damping result. In the particular embodiment illustrated in FIG. 4, the damping system signals include an SSTD control signal 403, generated by SSTD controller 406; and DTD control signal 404 generated by DTD controller 407. The turbine control reference signal 401 is also formed from an EPC control signal 405 generated by EPC controller 408. Although illustrated as distinct components, any of the secondary control systems 406-408 may actually be implemented in the main controller 220 of the turbine 100.

The inclusion of the secondary control system signals 403-405 in the turbine control reference signal 401 means that at a given instant in time the amount of energy extracted from the wind by the turbine may be greater than the energy passed to the grid 204. This excess energy may be dumped in a resistor connected between the machine side unit and the line side unit, for example a resistor connected on the DC link between the machine side unit and line side unit of converter 205. In such cases, the differences between control reference signals 401, 402 may be controlled to ensure that the machine side-line side power difference can be safely dumped onto the resistor, without the resistor overheating. For example, there may be a feedback mechanism from the resistor to the turbine controller/s so that the control reference signals 401, 402 can be generated based on the current state of the resistor, as well as based on the current conditions experienced by the turbine 100.

Figure 5:
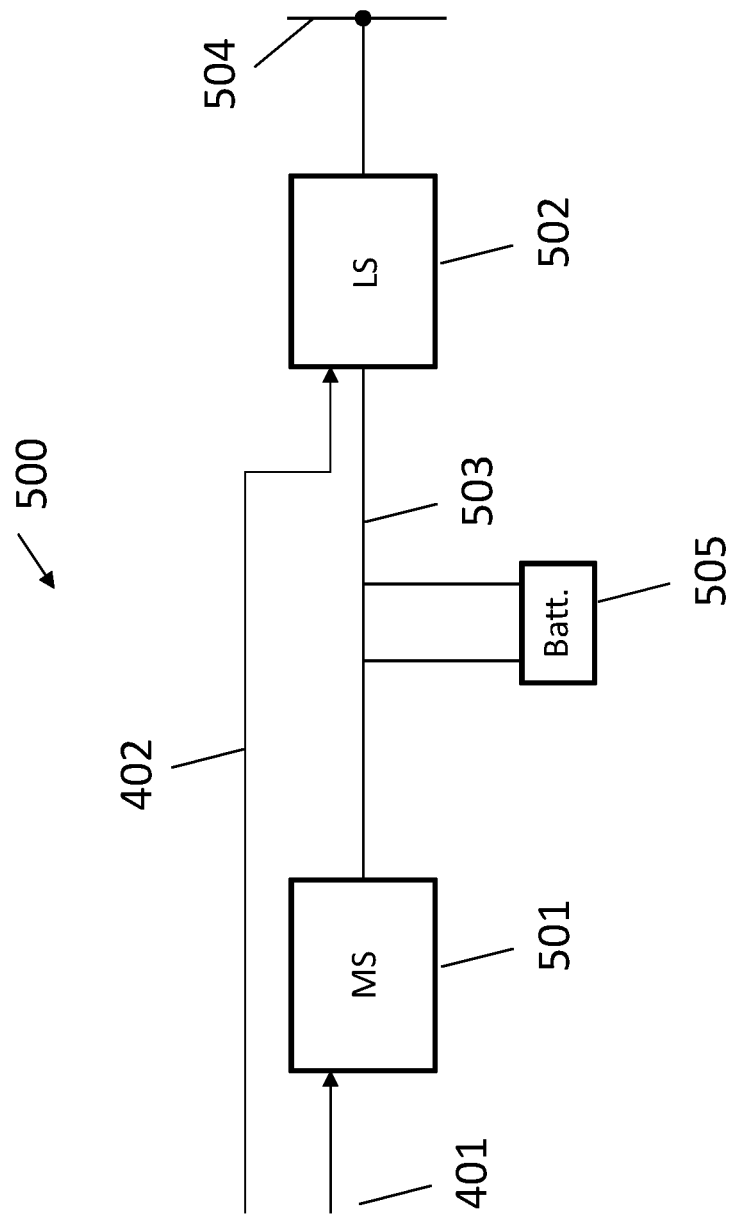
FIG. 5 illustrates a converter including a battery.

Alternatively, excess energy may be stored in a battery connected between the machine side unit and the line side unit. FIG. 5 illustrates elements of a converter 500 incorporating such a battery 504.

Converter 500 comprises a machine side unit 501 connected to a line side unit 502 by a DC link 503. The line side unit 502 transfers power to an electrical grid 504.

The machine side unit 501 supplies generated energy to the DC link 503 based on a turbine control reference signal 401, generated as described above. The line side unit 502 extracts energy from the DC link 503 and supplies it to the grid 504 based on a grid control reference signal 402, also generated as described above. In some embodiments, the line side unit 502 may additionally extract energy from the DC link 503 based on a current grid condition, for example to provide a virtual synchronous machine response.

As noted above, converter 500, and its machine side unit 501 and line side unit 502, should be considered to refer generally to both the logic controllers which receive the control reference signals 401, 402; and to the power electronics controlled by those logic controllers. As such, the converter 500 may be considered to be an example of a power or torque controller. The logic controllers may be implemented in a power controller, such as power controller 209. In such cases, the converter power electronics together with the power controller may be considered to form a power or torque controller.

Due to the different control reference signals 401 and 402, at any instant of time the energy transferred to the DC link 503 by the machine side unit 501 may not equal the energy extracted from the DC link by the line side unit 502. A battery 505 connected to the DC link 503 provides a buffer against such energy differences. When excess energy is provided by the turbine 100, it can be stored on the battery 505. When more energy is required by the grid 204 than is currently being generated by the turbine 100, for example to smooth a disturbance in the grid 204 by providing a VSM response, the excess energy can be extracted from the battery 505.

As the battery 505 has a limited storage capacity, a feedback mechanism may be used to provide the turbine controller/s with information about the current state of the battery 505. In this way, the turbine control reference signal 401 and grid control reference signal 402 may be generated based on the current state of the battery 505, ensuring that excess energy can be stored safely in the battery 505. In particular, the difference between generated power and extracted power may be limited based on the current capacity of the battery 505.

The capacity of the battery 505 available for buffering differences between generated and extracted power may also be dynamically determined based on a current grid condition. A storage controller may receive a grid performance indicator, representing the current state or health of the grid 504. Based on this grid performance indicator, the storage controller may determine a capacity of the battery 505 that should be reserved for fulling requirements of the grid 504, such providing a VSM response. Thus only the non-reserved capacity of the battery 505 may be used as a buffer. The dynamically determined non-reserved capacity of the battery 505 may be fed back to the turbine controller/s, so that the turbine control reference signal 401 and grid control reference signal 402 are generated based on the current dynamic capacity of the battery 505.

It will be appreciated that when averaged over time, the power generated by the turbine 100 should substantially equal the energy supplied to the grid 204, 504 (less any inefficiency losses). The turbine control reference signal 401 and grid control reference signal 402 may be generated to ensure that the difference between energy generated and transferred to the grid 204, 504 averages to zero over a certain time window. For example, the time window may be between 10 seconds and 2 minutes, or between 30 seconds and 1 minute.

Figure 6:
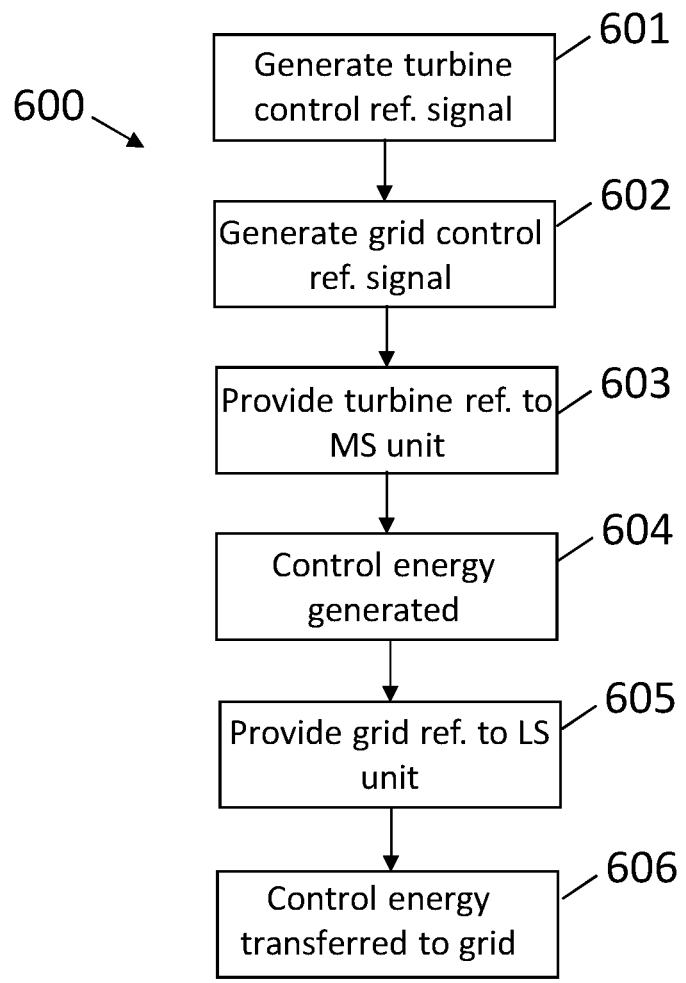
FIG. 6 illustrates a method according to the present invention.

FIG. 6 illustrates a method 600 of controlling a wind turbine 100 according to the present invention.

At step 601, a turbine control reference signal is generated, and at step 602, a grid control reference signal is generated. The turbine control reference signal and grid control reference signal may be generated by controllers of the turbine 100, as described above in relation to FIG. 4. The turbine control reference signal may be a power reference signal or a torque reference signal.

At step 603, the turbine control reference signal is provided to a machine side unit of a power or torque control system of the turbine, such as a machine side unit of a converter.

At step 604, the amount of energy generated by the turbine 100 is controlled by the machine side unit based on the turbine control reference signal.

At step 605, the grid control reference signal is provided to a line side unit of the power or torque control system, such as a line side unit of the converter. The line side unit may be connected to the machine side unit by a DC link.

At step 606, the amount of energy transferred to the electrical grid may be controlled using the line side unit based on the grid control reference signal.

A wind turbine control system, such as wind turbine control system 200, may be configured to perform the method 600. In particular, a memory associated with the turbine control system may store instructions which, when executed by one or more controllers of the wind turbine control system, perform the method 600.

Although the invention has been described above with reference to one or more preferred embodiments, it will be appreciated that various changes or modifications may be made without departing from the scope of the invention as defined in the appended claims.

The invention claimed is:

1. A method of controlling a wind turbine connected to an electrical grid, the method comprising:
generating a turbine control reference signal comprising a primary static power level signal and one or more secondary control system signals, the secondary control system signals include damping signals to dampen oscillations in the wind turbine;
generating a grid control reference signal as the primary static power level signal, wherein a time-dependent difference between the turbine control reference signal and the grid control reference signal averages to zero within a predetermined time window;

providing the turbine control reference signal to a machine side unit of a power or torque control system of the wind turbine;

controlling, using the machine side unit, an amount of energy generated by the wind turbine based on the turbine control reference signal;

providing the grid control reference signal to a line side unit of the power or torque control system; and controlling, using the line side unit, an amount of energy transferred to the electrical grid based on the grid control reference signal.

2. The method of claim 1, wherein the secondary control system signals are time varying signals.

3. The method of claim 1, wherein the secondary control system signals are oscillating signals with amplitudes and phases determined by the respective control system.

4. The method of claim 1, wherein the turbine control reference signal is a sum of the grid control reference signal and the one or more secondary control system signals.

5. The method of claim 1, wherein a duration of the predetermined time window is between 10 seconds and 2 minutes, or between 30 seconds and 1 minute.

6. The method of claim 1, wherein controlling the amount of energy generated by the wind turbine comprises controlling the amount of energy provided by the machine side unit to, or extracted by the machine side unit from, a battery connected between the machine side unit and the line side unit.

7. The method of claim 6, further comprising:
receiving a grid performance indicator; and
controlling the amount of energy provided to, or extracted from, the battery based on the grid performance indicator.

8. The method of claim 6, further comprising adjusting the turbine control reference signal or the grid control reference signal based on a remaining storage capacity of the battery.

9. The method of claim 1, wherein controlling the amount of energy generated by the wind turbine comprises controlling the amount of energy provided, by the machine side unit, to a resistor connected between the machine side unit and the line side unit.

10. The method of claim 1, wherein the power or torque control system is a converter.

11. The method of claim 1, wherein controlling the energy transferred to the electrical grid comprises emulating a synchronous generator.

12. A wind turbine control system, comprising:
one or more processors configured to:
generate a turbine control reference signal comprising a primary static power level signal and one or more secondary control system signals, the secondary control system signals include damping signals to dampen oscillations in a turbine;
generate a grid control reference signal as the primary static power level signal, wherein a time-dependent difference between the turbine control reference signal and the grid control reference signal averages to zero within a predetermined time window;
an I/O interface configure to:
provide the turbine control reference signal to a machine side unit of a power or torque control system of the turbine to control an amount of energy generated by the turbine; and
provide the grid control reference signal to a line side unit of the power or torque system to control an amount of energy transferred to an electrical grid.

13. A wind turbine, comprising:
a tower;
a nacelle disposed on the tower;
a turbine control system configured to:
generate a turbine control reference signal comprising a primary static power level signal and one or more secondary control system signals, the secondary control system signals include damping signals to dampen oscillations in the wind turbine;
generate a grid control reference signal as the primary static power level signal, wherein a time-dependent difference between the turbine control reference signal and the grid control reference signal averages to zero within a predetermined time window;
provide the turbine control reference signal to a machine side unit of a power or torque control system of the wind turbine to control an amount of energy generated by the wind turbine; and
provide the grid control reference signal to a line side unit of the power or torque system to control an amount of energy transferred to an electrical grid.

14. The wind turbine control system of claim 12, wherein the secondary control system signals are time varying signals.

15. The wind turbine control system of claim 12, wherein the secondary control system signals are oscillating signals with amplitudes and phases determined by the respective control system.

16. The wind turbine control system of claim 12, wherein the turbine control reference signal is a sum of the grid control reference signal and the one or more secondary control system signals.

17. The wind turbine of claim 13, wherein the secondary control system signals are time varying signals.

18. The wind turbine of claim 13, wherein the secondary control system signals are oscillating signals with amplitudes and phases determined by the respective control system.

19. The wind turbine of claim 13, wherein the turbine control reference signal is a sum of the grid control reference signal and the one or more secondary control system signals.

* * * * *